(No Model.)
B. P. ROBERTS.
BRIDLE BIT.
No. 328,975. Patented Oct. 27, 1885.
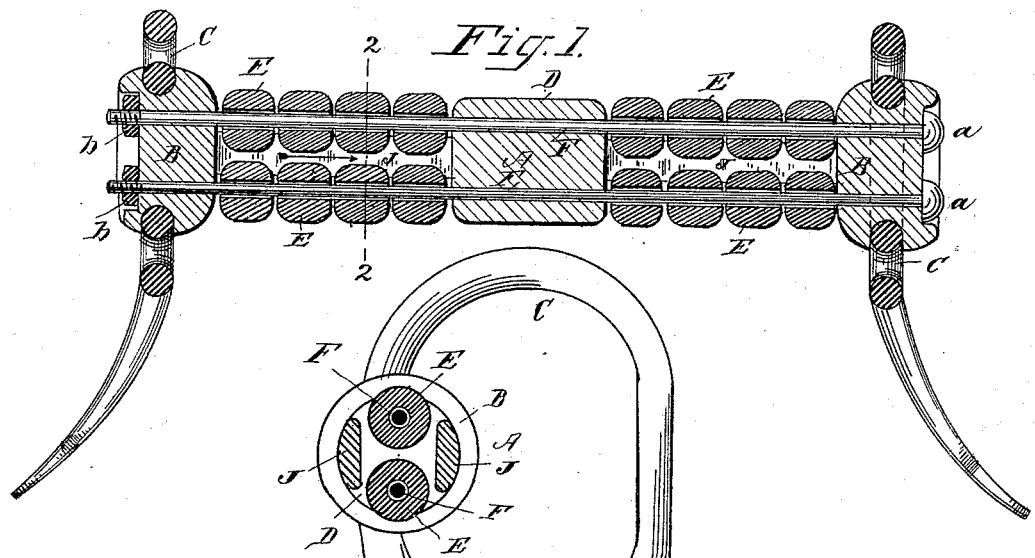
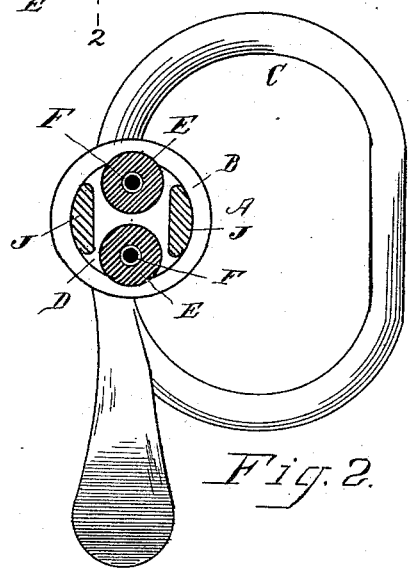
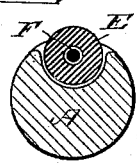
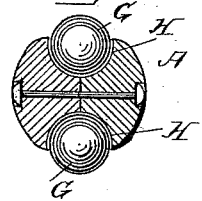
Witnesses
Wm. L. Bellow
R. H. Spalding
Benj. P. Roberts
Inventor
per Browns Bros.
Attorneys

UNITED STATES PATENT OFFICE.

BENJAMIN P. ROBERTS, OF BOSTON, MASSACHUSETTS.

BRIDLE-BIT.

SPECIFICATION forming part of Letters Patent No. 328,975, dated October 27, 1885.

Application filed February 9, 1885. Serial No. 155,398. (No model.)

*To all whom it may concern:*

Be it known that I, BENJAMIN P. ROBERTS, of Boston, in the county of Suffolk and State of Massachusetts, have invented certain new and useful Improvements in Bridle-Bits, of which the following is a full, clear, and exact description.

The main object of this invention is to construct a bridle-bit so that the animal cannot possibly secure or maintain such a grip or hold upon it by and between his jaws as to render it incapable of responding to the driving-reins, and consequently useless as a means of guiding or directing or controlling the animal by the driver, and which is practically the sole purpose for which the bit is used.

To this end the invention consists of a bridle-bit having a surface or a series of surfaces, which preferably are in the form of a roller or rollers or thimbles, made of a material such as wrought-iron or steel, or other metal or material, preferably one that is practically unyielding or rigid, although other materials which are suitable therefor may be used, such as are adapted to roll or rotate under pressure from or in contact with the jaws of the animal, but which exert no practical side pressure or force because of such pressure from contact with the jaws of the animal in the direction of the length of the bit, or, in other words, transversely to or across the animal's jaws, and are otherwise adapted and applied to the bit for direct pressure or contact to be had upon or with it or them from only one jaw of the animal, substantially as hereinafter described.

In the accompanying plate of drawings, the present improved bridle-bit is illustrated, and Figure 1 is a longitudinal section showing the most preferable construction of the bit as to its rolling or moving surfaces in accordance with this invention. Fig. 2 is a cross-section on line 2 2, Fig. 1. Figs. 3 and 4 are cross-sections, similar to Fig. 2, illustrating modifications.

In the drawings, A is the bit proper, carrying at its ends B a ring, C, to which the driving and check reins are connected. The bit A, Fig. 1, is composed of two end pieces, B, a center piece, D, and two parallel rows of separate rollers, E, of ball shape. The rollers E are made preferably of a material such as wrought-iron, steel, or other metal or material, preferably one that is practically unyielding or rigid, although other materials which are suitable therefor may be used, and they are strung upon separate parallel axial rods or shafts F, joining the end and center pieces, B and D, of the bit, and they fill the spaces between the end and center pieces, but they are all left free for separate rotation upon their respective axial rods, and for the rollers on the one to have preferably no contact with those on the other and parallel rod. Again, these separate and parallel rows of rollers are arranged to present the surfaces of the one row for contact with the upper jaw, and the surfaces of the other row of rollers for contact with the lower jaw of the animal, and, if desired, either one or both rows of rollers may extend entirely along the length from one end piece B to the other of the bit.

A bit constructed as above described obviously presents to either jaw of the animal a surface capable of rolling or rotating from contact with or pressure from said jaw alone, and irrespective and independent of the pressure from or contact with the other jaw of the animal, which may at the same time be exerted by the animal upon the surface of the bit, also capable of rolling or rotating therefrom, which is at the opposite side of the bit, and the pressure upon or contact with the said rolling or rotating surfaces from the jaws of the animal, as aforesaid, exerts no practical side pressure or force upon the bit—that is, in the direction of its length. By this means it is rendered impossible for the animal to secure or maintain a grip or hold upon the bit by and between his jaws sufficient to resist the control of the driver exerted through the driving-reins.

It is preferable to construct the bit with a rolling or rotating surface, on its opposite sides, and to divide each of such surfaces into separate and distinct parts, substantially as fully shown in Figs. 1 and 2, and as has been herein particularly described. The same result, however, may be secured by providing the bit with a continuous rolling or rotating surface on opposite sides, or only on one side, as shown in Fig. 3, or by providing its opposite sides or only one side with a series of balls, G, arranged to rotate or roll in sockets or cavities H of the bit proper, presenting in their projection from the sockets their convex surface to the jaws of the animal, as shown in Fig. 4, the sockets H being shaped to sufficiently surround the balls to secure them against escape. Again, if the bit is provided with a roller or rollers extending either continuously from end to end thereof, or along only a portion thereof and between fixed end pieces thereof, the roller or rollers may be adapted at either end to turn in suitable bearing-sockets or upon suitable bearing-studs of such end pieces, and in such case the carrying-rods F may be dispensed with; and, again, the rollers may be made solid or tubular, as may be desired.

The end pieces, B, and center piece, D, of the bit, as shown in Figs. 1 and 2, are joined by side bars or strips, J, attached to and making a part of said ends and center; but these side bars are not absolutely necessary.

The axial shafts or rods for the rollers, as shown in Fig. 1, have a head, $a$, at one end and a screw-nut, $b$, at the other end, and pass through the end and center pieces of the bit, and all the parts are fastened together by setting up the screw-nuts $b$; but the rods and end and center pieces may be attached together in other obvious ways—as, for instance, rigidly attached instead of detachably attached, as described.

This invention is, in substance, of a bit having on either or both of its opposite sides, which in the use of the bit make contact with the upper and lower jaws of the animal, a surface, or preferably a series of surfaces, constructed and arranged to rotate or roll under direct pressure or contact with the jaw of the animal only at such side of the bit, but to exert no practical side pressure or force upon the bit—that is, in the direction of its length—and it is not intended to limit in this regard the invention to any particular form or construction or arrangement of such a surface or surfaces, or to their application to either one or to both of the opposite sides of the bit.

The rollers of either of the parallel rows of rollers E may have contact with those of the other row, but such contact is not necessary, and preferably it is best not to have it; and, again, rollers E may be arranged in two series—one at each end of the opposite ends or portions of the bit—the one series in position for contact with and pressure from only the upper jaw, and the other in position for contact with and pressure from only the lower jaw of the animal.

Having thus described my invention, what I claim, and desire to secure by Letters Patent, is—

1. A bridle-bit provided with a surface or surfaces practically unyielding and arranged upon the bit and otherwise adapted for direct contact with or pressure from one jaw only of the animal, and under such contact or pressure to be capable of rotating or rolling without lateral pressure or force—that is, in the direction of the length of the bit or from side to side of the animal's mouth or jaws—to any practical degree, substantially as described, for the purpose specified.

2. A bridle-bit provided with surfaces practically unyielding, located in separate and distinct lines or rows, and the surface or surfaces of each line or row of surfaces arranged upon the bit and otherwise adapted for direct contact with or pressure from one jaw only of the animal, and under such contact or pressure to be capable of rotating or rolling without lateral pressure or force—that is, in the direction of the length of the bit or from side to side of the animal's mouth or jaws—to any practical degree, substantially as described, for the purpose specified.

3. A bridle-bit composed of end pieces, B, and parallel rods F, each carrying rollers E, substantially as described, for the purpose specified.

4. A bridle-bit having a rolling or rotating surface or surfaces in and along separate and distinct lines thereof, in combination with a bar or bars, J, located at the side or sides of said separate and distinct lines of rolling or rotating surface or surfaces, substantially as described, for the purposes specified.

5. A bridle-bit composed of end pieces, B, parallel rods F, each carrying rollers E and bars J, connecting ends B, and at the side of parallel rods F, and their rollers E, substantially as described, for the purpose specified.

6. A bridle-bit composed of end pieces, B, and intermediate block, D, in combination with a rolling or rotating surface or surfaces between said end pieces and said block, substantially as described, for the purpose specified.

7. A bridle-bit composed of end pieces, B, intermediate block, D, and parallel rods F, each carrying rollers E, substantially as described, for the purpose specified.

8. A bridle-bit composed of end pieces, B, intermediate block, D, parallel rods F, each carrying rollers E, and bars J, connecting end pieces, B, and intermediate block, D, and at the side of rods F, and their rollers, substantially as described, for the purpose specified.

In testimony whereof I have hereunto set my hand in the presence of two subscribing witnesses.

BENJN. P. ROBERTS.

Witnesses:
WM. S. BELLOWS,
ALBERT W. BROWN.